United States Patent
Nordstrom

[11] Patent Number: 5,922,377
[45] Date of Patent: Jul. 13, 1999

[54] APPARATUS FOR FLAVORING FOOD

[76] Inventor: Eric P. Nordstrom, 7 Glen Ave., Millbury, Mass. 01527

[21] Appl. No.: 08/666,016

[22] Filed: Jun. 19, 1996

[51] Int. Cl.⁶ .................................................. A23L 1/221
[52] U.S. Cl. ........................ 426/132; 426/134; 426/652; 426/523; 99/419; 99/494
[58] Field of Search ................................. 426/132, 134, 426/85, 86, 420, 421, 281, 523, 652; 99/494, 419, 421 A, 532

[56] References Cited

U.S. PATENT DOCUMENTS

| | | |
|---|---|---|
| 343,306 | 6/1886 | Francke . |
| 390,170 | 9/1888 | Humaston . |
| 532,359 | 1/1895 | Bradley . |
| 609,799 | 8/1898 | Flinn . |
| 774,394 | 11/1904 | Peter ......................................... 99/494 |
| 854,387 | 5/1907 | Snyder ..................................... 99/494 |
| 867,044 | 9/1907 | Huss ......................................... 99/494 |
| 889,965 | 6/1908 | Rasmussen ............................... 99/494 |
| 1,100,907 | 6/1914 | Peterson . |
| 2,116,310 | 5/1938 | Harvey ..................................... 426/134 |
| 2,128,448 | 8/1938 | Wright ..................................... 426/85 |
| 2,212,477 | 8/1940 | Mayer . |
| 2,489,556 | 11/1949 | Blake ....................................... 99/494 |
| 2,602,391 | 7/1952 | Pedranti et al. ......................... 99/345 |
| 2,652,765 | 9/1953 | Risco ....................................... 99/345 |
| 2,759,830 | 8/1956 | Touceda ................................... 426/415 |
| 2,776,634 | 1/1957 | Morton ..................................... 426/132 |
| 2,902,371 | 9/1959 | Shorr ........................................ 426/415 |
| 2,906,629 | 9/1959 | Oppenheiner ............................ 426/652 |
| 3,042,532 | 7/1962 | Daline ...................................... 426/412 |
| 3,252,803 | 5/1966 | Belasco .................................... 426/86 |
| 3,326,695 | 6/1967 | Neuhauser ................................ 426/85 |
| 3,526,316 | 9/1970 | Kalogris ................................... 426/86 |
| 3,740,239 | 6/1973 | Chancellor, Jr. ......................... 426/132 |
| 3,824,322 | 7/1974 | Florella .................................... 426/86 |
| 4,061,783 | 12/1977 | Hoffman et al. ......................... 426/134 |
| 4,163,446 | 8/1979 | Jamshidi . |
| 4,178,660 | 12/1979 | Olney et al. ............................. 99/532 |
| 4,294,168 | 10/1981 | Redhead .................................. 426/132 |
| 4,414,885 | 11/1983 | Kelly . |
| 4,703,688 | 11/1987 | Ochs ........................................ 99/450.8 |
| 4,849,231 | 7/1989 | Spee ......................................... 426/132 |
| 5,206,044 | 4/1993 | Walton, Jr. ............................... 426/113 |

FOREIGN PATENT DOCUMENTS

| | | |
|---|---|---|
| 408164 | 1/1991 | European Pat. Off. ............... 426/132 |
| 4307015 | 10/1992 | Japan . |
| 2065458 | 7/1981 | United Kingdom . |

Primary Examiner—Steven Weinstein
Attorney, Agent, or Firm—Pandiscio & Pandiscio

[57] ABSTRACT

The present invention relates to the flavoring of various foods and comprises a rod, materials disposed along an outer surface portion of the rod for flavoring the food item, and a binder for releasably retaining the flavoring materials in position on the outer surface portion of the rod during preparation of the food item. In one preferred embodiment of the present invention, the flavoring materials are releasably bound to the outer surface of the rod by a binder consisting essentially of partially hydrogenated cotton seed oil, partially hydrogenated soybean oil and soybean lecithin. In a further embodiment of the invention, a protective sheath is provided that covers the rod during insertion into the food item.

13 Claims, 13 Drawing Sheets

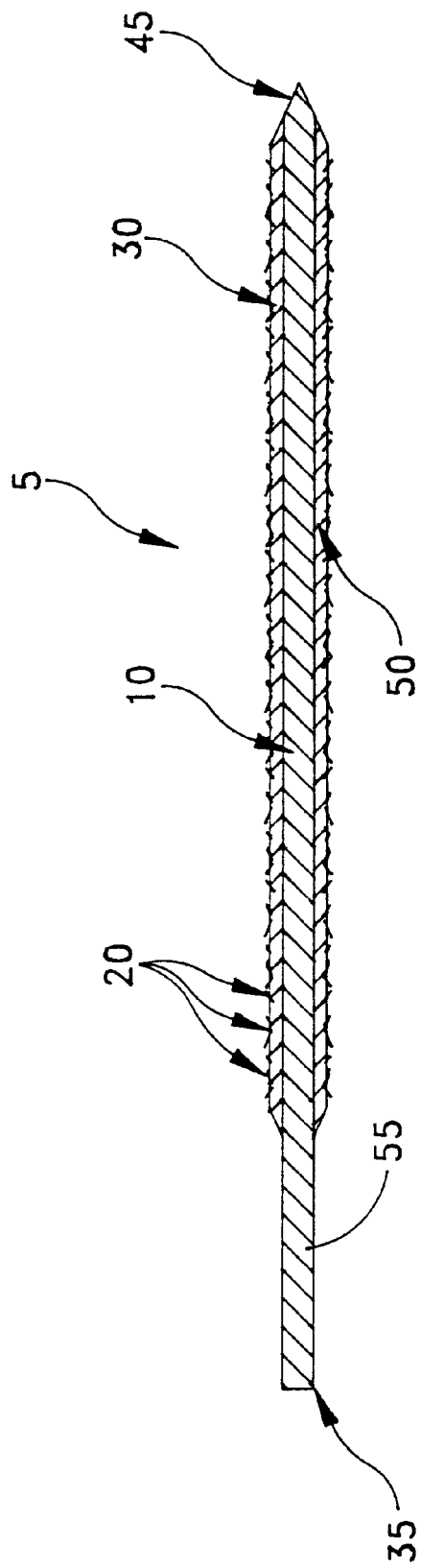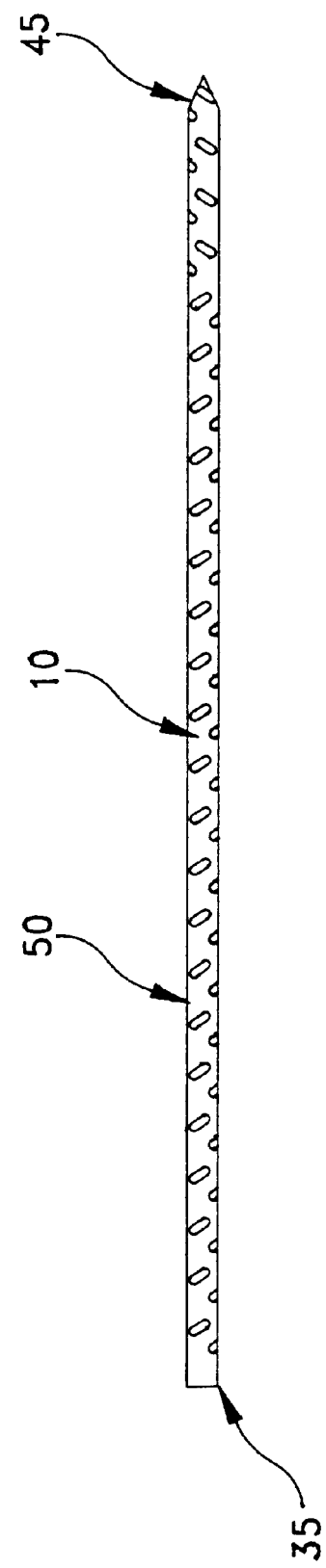

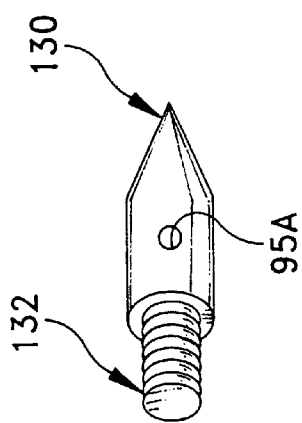
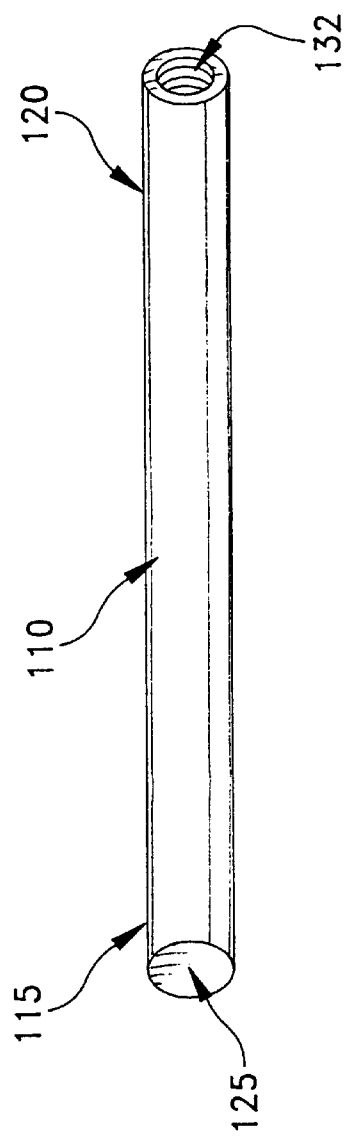

APPARATUS FOR FLAVORING FOOD

FIELD OF THE INVENTION

The present invention relates to the preparation of food in general, and more particularly to apparatus and methods for flavoring foods.

BACKGROUND OF THE INVENTION

Traditionally, meats such as beef, veal, pork, lamb, fowl and wild game have had seasonings added to them, both before and during cooking, in order to enhance and improve their flavor. In particular, spices, herbs and vegetables have long been used in the culinary arts to flavor meats by sprinkling such flavoring agents over the top of the meat both before and during cooking. Unfortunately, while the outer surface of the meat may be flavored in this way, these seasonings often do not penetrate into the meat sufficiently to produce a desired uniform effect throughout.

Consequently, many devices and techniques have been introduced over the years for placing such seasonings into the interior of meats both before and during cooking. See, for example, U.S. Pat. Nos. 2,116,310, issued on May 3, 1938, to Holman Harvey; 2,212,477, issued on Aug. 20, 1940, to Herman J. Mayer; 2,489,556, issued on Nov. 29, 1949, to Harry D. Blake; 4,178,660, issued on Dec. 18, 1979, to Alvin A. Olney et al.; 4,294,168, issued on Oct. 13, 1981, to Walden K. Redhead; and 4,414,885, issued on Nov. 15, 1983, to Harry C. Kelly.

Unfortunately, none of the seasoning devices and techniques developed to date is completely satisfactory. Some of these known devices are not effective enough during use; others can be inconvenient to use, particularly in a non-commercial setting.

For example, in U.S. Pat. No. 2,116,310, issued to Harvey, small pieces of meat are skewered with a small stick. This stick may be steeped in a flavoring solution before being inserted into the meat, whereby the flavor will flow into the meat during cooking. Alternatively, the stick may be provided with small openings or slots along its length for receiving solid particles of salt, pepper, or other flavoring substances. These solid particles of flavoring substances are intended to be carried into the interior of the meat as the stick is inserted into the pieces of meat, whereupon they will flow into the meat during cooking.

Unfortunately, devices such as the one taught by Harvey often prove inadequate for a number of reasons. For one thing, where the stick is steeped in a flavoring solution, inadequate quantities of the flavoring substances may be delivered to the meat. For another thing, where solid particles of flavoring substances are disposed in small openings or slots in the stick, the solid particles of flavoring substances may be scraped out of the small openings or slots during the insertion procedure. This can also result in inadequate quantities of the flavoring substances being delivered to the interior of the meat.

As another example, U.S. Pat. No. 4,294,168, issued to Redhead, teaches the use of an elongate, heat conductive shaft having a spiral groove running along its length. This groove comprises internal top and bottom support areas that are adapted to hold and dispense chemicals into an object, including dispensing flavoring substances into food. More particularly, Redhead's device is intended to be inserted into and through the food item, and relies upon the particular configuration of the spiral groove to protect the flavoring substances against displacement during insertion.

Unfortunately, Redhead's spiral groove can be difficult to fabricate with certain types of shafts (e.g., wooden shafts), and it can be difficult to fill with the desired flavoring substances.

As a result, there has existed a long felt need for an improved apparatus and method for flavoring foods (and in particular meats) which ensure the proper placement of seasonings or tenderizers substantially within the interior of meat prior to, and during, cooking, and which are easily used by the amateur chef.

OBJECTS OF THE INVENTION

Accordingly, a primary object of the present invention is to provide an improved apparatus and method for flavoring foods.

Another object of the present invention is to provide an improved apparatus for flavoring a food item that may be inserted into the food item without the flavoring substances being scraped off the apparatus during insertion.

Still another object of the present invention is to provide an improved apparatus for flavoring a food item that uses a lipid material or carbohydrates or hydrocolloids to releasably retain flavoring means on a delivery device.

And another object of the present invention is to provide an improved apparatus and method for flavoring a food item that utilize a sheath to protect the flavoring means during insertion into the food item.

Yet another object of the present invention is to provide an improved apparatus and method for flavoring a food item that are easily used by both professional and amateur chefs.

A further object of the present invention is to provide an improved apparatus and method for flavoring a food item that are economical to produce and simple to use.

And another object of the present invention is to provide an improved apparatus and method for flavoring a food item which ensure proper dispersal of the flavoring substances within the food item.

SUMMARY OF THE INVENTION

These and other objects of the present invention are achieved through the provision and use of a novel apparatus for flavoring a food item, wherein the novel apparatus comprises a novel flavoring stick.

The flavoring stick comprises a rod, flavoring means disposed along an outer surface of the rod for flavoring the food item, and retaining means for releasably retaining the flavoring means in position along the outer surface of the rod during insertion of the flavoring stick into the food item.

In one preferred embodiment of the present invention, the flavoring means are releasably bound along the outer surface of the rod by a binder comprising a lipid material or carbohydrates or hydrocolloids.

In one particularly preferred embodiment of the present invention, the flavoring means are releasably bound along the outer surface of the rod by a binder consisting essentially of partially hydrogenated cotton seed oil, partially hydrogenated soybean oil and soybean lecithin.

In one preferred method for flavoring food using the apparatus of the present invention, a rod having flavoring means bound along a portion thereof is inserted into a portion of the food, whereafter the binder can release the flavoring means from the rod so that the flavoring means will permeate into the food.

In a further embodiment of the present invention, a protective sheath is provided to cover the flavoring stick as the flavoring stick is passed into a piece of meat. The sheath comprises a closed distal end that is sharpened for piercing the meat, a central bore sized to receive the rod, and an open proximal end, whereby the sheath may be inserted into and through the meat, distal end first, and whereby the flavoring stick may be partially disposed within the sheath so that when the sheath is removed from the meat, distal end first, the flavoring stick may be held in place within the meat by means of the proximal end of the rod.

In one method for flavoring meat using the sheath apparatus of the present invention, the sheath is inserted into and through the meat, distal end first, so as to position the open proximal end of the sheath adjacent to a first surface of the meat. A flavoring stick is then placed into the sheath. In this position, a graspable portion of the proximal end of the flavoring stick's rod projects outwardly from the first surface of the meat. Also in this position, a graspable portion of the sharp distal end of the sheath is disposed adjacent to and projecting outwardly from a second surface of the meat. To complete the positioning of the flavoring stick within the meat, the flavoring stick is first grasped at the graspable portion of the proximal end of the rod so as to hold the flavoring stick in place relative to the meat, and then the distal end of the sheath is grasped and drawn axially and distally from the meat, thereby leaving the flavoring stick captured within the meat without disturbing the flavoring means.

BRIEF DESCRIPTION OF THE DRAWINGS

These and other objects, features and advantages of the present invention will be more fully disclosed in, or rendered obvious by, the following detailed description of the preferred embodiments of the invention, which are to be considered together with the accompanying drawings wherein like numbers refer to like parts and further wherein:

FIG. 1 is a side view, partially in cross-section, of a flavoring stick formed in accordance with the present invention;

FIG. 2 is a side view of the flavoring stick's rod showing the rod's textured outer surface;

FIG. 12 is a schematic side view of an alternative sheath formed in accordance with a further embodiment of the present invention;

FIG. 13 is a side view of the removable distal tip associated with the sheath shown in FIG. 12;

DETAILED DESCRIPTION OF THE PREFERRED EMBODIMENTS

FIG. 1 is a cross-sectional view of a flavoring stick 5 which comprises one preferred embodiment of the present invention. Flavoring stick 5 generally comprises a rod 10, flavoring means 20 and a binder 30.

Figure 3:
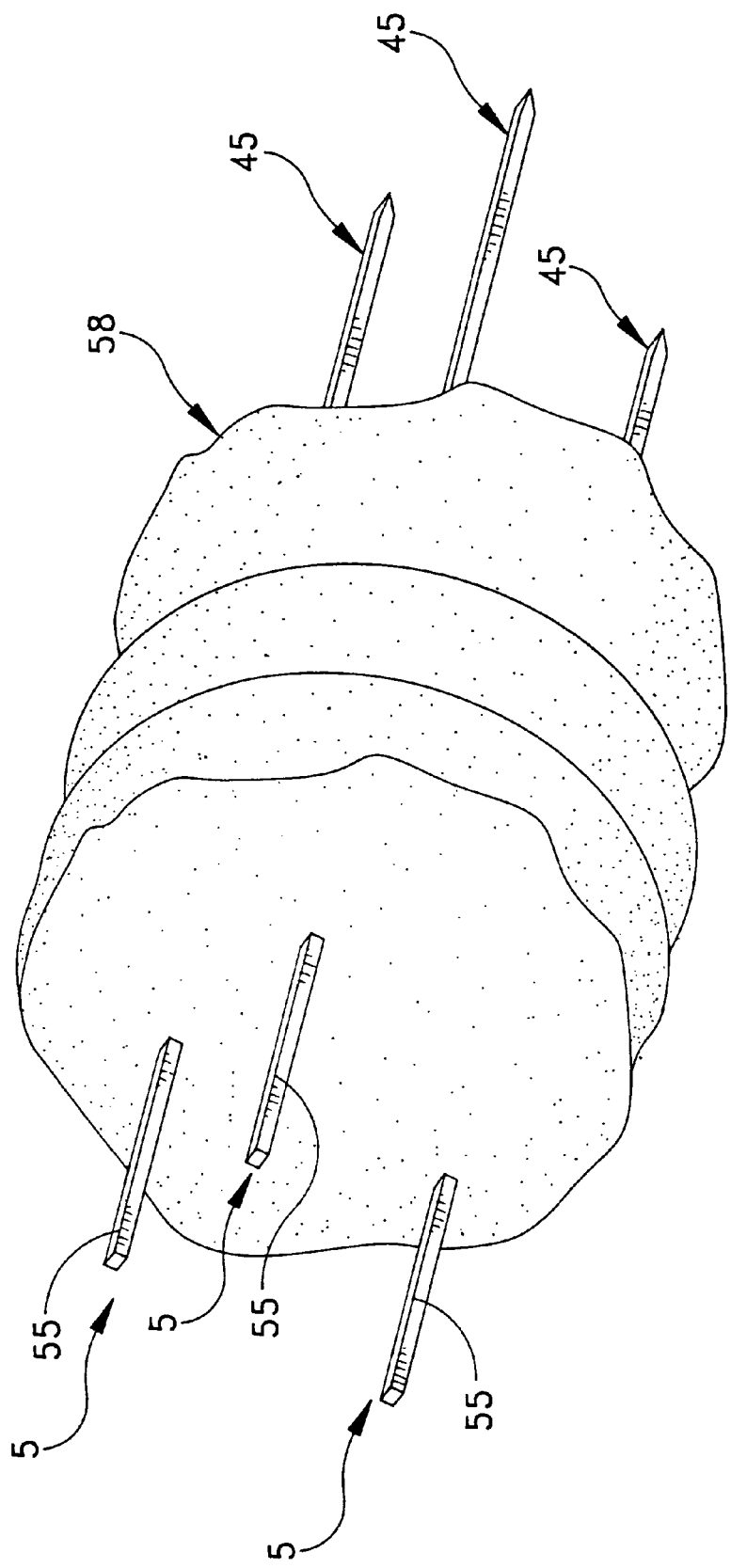
FIG. 3 is a perspective view of a piece of meat having a plurality of flavoring sticks positioned therein.

More particularly, rod 10 generally comprises a proximal end 35, a distal end 45, and an outer surface 50. Proximal end 35 includes a graspable portion 55. Distal end 45 is preferably sharpened or pointed so as to facilitate insertion of flavoring stick 5 into a food item 58 (FIG. 3), as will hereinafter be disclosed in further detail. Outer surface 50 of rod 10 preferably comprises a roughened texture (FIG. 2) so as to improve the adherence of binder 30 to the rod, as will hereinafter be disclosed in further detail.

Rod 10 is preferably formed from an elongate piece of material that is relatively stiff, heat-tolerant, and non-toxic, such as wood, bamboo, or heat-resistant paper. Rod 10 may be either solid or hollow. It will be appreciated that, in the case where rod 10 is to be formed from wood, any one of the woods traditionally used to smoke-flavor food may be used, e.g., hickory, apple, oak, mesquite, etc. Typically, rod 10 is about eight inches or so in length. However, it will be appreciated that rod 10 may be of any suitable length, depending upon the size of the food item which is to be flavored.

Flavoring means 20 may comprise any of the many dried spices, herbs, or vegetables traditionally used to flavor food. For example, flavoring means 20 might comprise spices such as pepper, nutmeg, cinnamon, cloves, coriander, etc.; and/or herbs such as rosemary, thyme, basil, parsley, oregano, dill, etc.; and/or aromatic vegetables such as garlic, onions, shallots, peppers, celery, etc. It will also be understood that flavor enhancers such as monosodium glutamate, salt, sugar, etc., as well as meat tenderizers, may be used with the present invention.

In each of the preferred embodiments of the present invention, flavoring means 20 are releasably bound to the outer surface 50 of rod 10 by binder 30. More particularly, binder 30 preferably comprises an edible adhesive compound that can be coated onto outer surface 50 of rod 10. Preferably, the consistency of binder 30 varies with temperature. In particular, at elevated temperatures, binder 30 preferably comprises a first, somewhat viscous and adhesive consistency so that the binder may be adhesively applied to rod 10, and so that flavoring means 20 may be releasably bound to the binder material. At room temperatures, binder 30 preferably comprises a second, relatively stiff or hard consistency that enables binder 30 to firmly bind flavoring means 20 to rod 10 and thereby prevent flavoring means 20 from being scraped off rod 10 during handling or use.

For example, binder 30 may comprise a lipid material or carbohydrates or hydrocolloids. Binder 30 may comprise any of the known edible fats or sugars used in connection with food preparation, such as hydrogenated and partially hydrogenated oils, butter, lard, shortening, etc.; and/or sugar, corn syrup, molasses, or the like. In one preferred embodiment of the invention, binder 30 comprises a lipid material consisting essentially of a partially hydrogenated blend of vegetable oils and emulsifiers which, when subjected to elevated temperatures, forms a viscous adhesive binder, but which, at room temperatures, forms a stiff, hard coating.

It has been found that a binder formed from a blend of partially hydrogenated soybean oil, partially hydrogenated cottonseed oil and soybean lecithin is particularly advantageous for use in connection with the present invention. More particularly, at elevated temperatures (i.e., above about 100° F.) such a material becomes quite viscous so as to allow for the effective coating of rods 10. At lower temperatures (i.e., below about 100° F.) this material becomes increasingly more viscous and tacky so as to aid in the deposition and retention of flavoring means 20 on rod 10. At room temperatures, this material becomes very hard and stiff, thus providing a strong bond between flavoring means 20 and rod 10. Also, this material has very little taste or odor of its own, and therefore does not contribute significantly to the flavoring of the food item. A binder formed from the above-disclosed material preferably comprises the following characteristics: a peroxide value (me/kg) of about 0.4, a free fatty acid percent weight of about 0.05, a Wiley melt point of about 119° F., and a solid fat index at 50° F. of about 72, at 70° F. of about 71, at 80° F. of about 70, at 92° F. of about 65, and at 104° F. of about 44.

It will also be understood that various additives may be combined with binder 30 in order to increase the binder's shelf life. In one preferred embodiment of the present invention, ascorbic acid palmitate is used for this purpose with good results. Of course, it will be appreciated that other such additives may be used with equal effect.

A shortening flake comprising a blend of partially hydrogenated soybean oil, partially hydrogenated cottonseed oil and soybean lecithin, marketed by the Bunge Foods Company of Rolling Meadows, Ill., USA under the trademark "MR. CHIPS", may be used as binder 30 with good results.

Rod 10 is preferably coated with flavoring means 20 in the following manner.

Depending upon the number of rods to be manufactured, a suitable quantity of binder 30 is first heated. If the lipid shortening flakes disclosed hereinabove are to be used as the binder 30, the flakes should be heated to a temperature of about 120° F. or so, until the shortening flakes melt and become quite viscous. At this point, the binder is allowed to cool slightly so as to increase its adhesive properties. Then binder 30 is brushed onto each of the uncoated rods 10, until a substantial portion of each of the rod's outer surface 50 is uniformly coated with the binder. Alternatively, binder 30 may be applied to rods 10 by dipping or spraying or in other ways known in the art. It will be understood that the textured outer surface 50 of rod 10 will enhance the adherence of binder 30 to the rod by increasing the effective surface area of rod 10. Preferably, about a 1 inch portion of the proximal end of rod 10 is left uncoated so as to form graspable portion 55 (FIG. 1). Once each rod 10 is coated with binder 30, the rod is dipped or rolled in a desired flavoring means 20. The chosen flavoring means should be uniformly distributed over the entire surface of the binder as a result of the dipping or rolling procedure, so as to ensure even flavoring of the food item during cooking. Preferably, the coated flavoring sticks 5 comprise a substantially round cross-sectional shape after they are fully impregnated with flavoring means 20.

In one preferred method of coating rods 10 with flavoring means 20, a quantity of flavoring means 20 is placed onto a sheet of non-stick material such as wax paper. Then a rod is coated with binder 30 and, while binder 30 is still somewhat adhesive and viscous, the rod is placed in the middle of the sheet, on top of flavoring means 20. The sheet is then folded over the rod and the rod is rolled back and forth in the folded sheet, so as to distribute and embed the flavoring means over the entire outer surface of the binder. Alternatively, flavoring means 20 may be applied to rod 10 by dipping or spraying or in other ways known in the art. Once each rod is uniformly coated with flavoring means 20, the assemblage is allowed to cool and solidify. It will be appreciated that, at room temperature, binder 30 will be substantially hard to the touch. It will also be appreciated that, at room temperature, flavoring means 20 will be securely bound to, and uniformly distributed over, rod 10.

If desired, a top coating of binder 30 may be applied over flavoring means 20 to seal in the flavoring means and to provide flavoring stick 5 with a tough outer layer.

A plurality of flavoring sticks 5, prepared according to the foregoing procedure, may be used to flavor a piece of meat in the following manner. Each flavoring stick 5 is first oriented so that its sharp distal end 45 is disposed on the surface of the meat. The flavoring stick is then pushed, distal end first, into and through the meat, until the flavoring stick is lodged within a portion of the meat. This procedure is repeated with each of the flavoring sticks until the desired number of flavoring sticks are lodged in the meat (see FIG. 3). The meat may then be further processed by marinating or cooking it.

It will be understood that, in order to properly cook most meats, the interior temperature of the meat must be raised above at least about 120° F. or so. Advantageously, as the temperature of the meat rises, binder 30 will begin to soften, returning to its first somewhat viscous and adhesive consistency. As this occurs, flavoring means 20 will be slowly released into the interior of the meat. As the temperature of the interior of the meat rises above about 120° F., binder 30 will transition to a substantially liquid consistency, thereby fully releasing the remainder of flavoring means 20 into the interior of the meat. Then, when the interior temperature of the meat has risen to a desired level (e.g., to about 140° F. for rare roast beef) the meat may be removed from the oven or other cooking means, and rods 10 may be pulled axially and proximally from the meat prior to cutting and serving of the meat.

Figure 4:
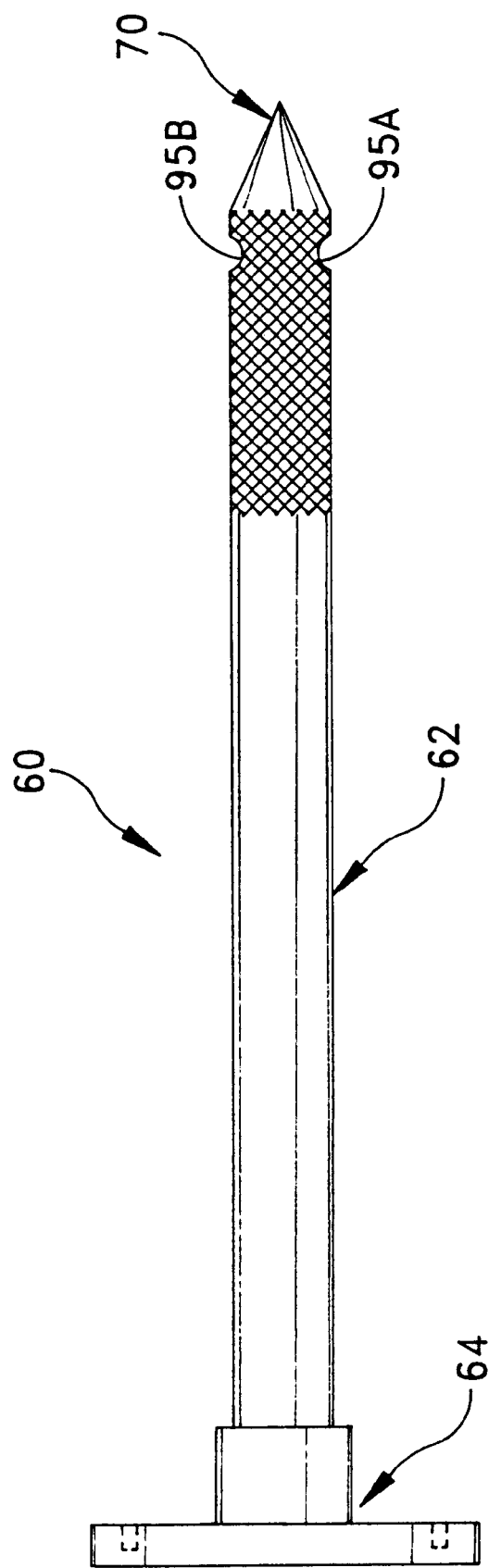
FIG. 4 is a side view of a sheath assembly formed in accordance with one embodiment of the present invention.
Figure 5:
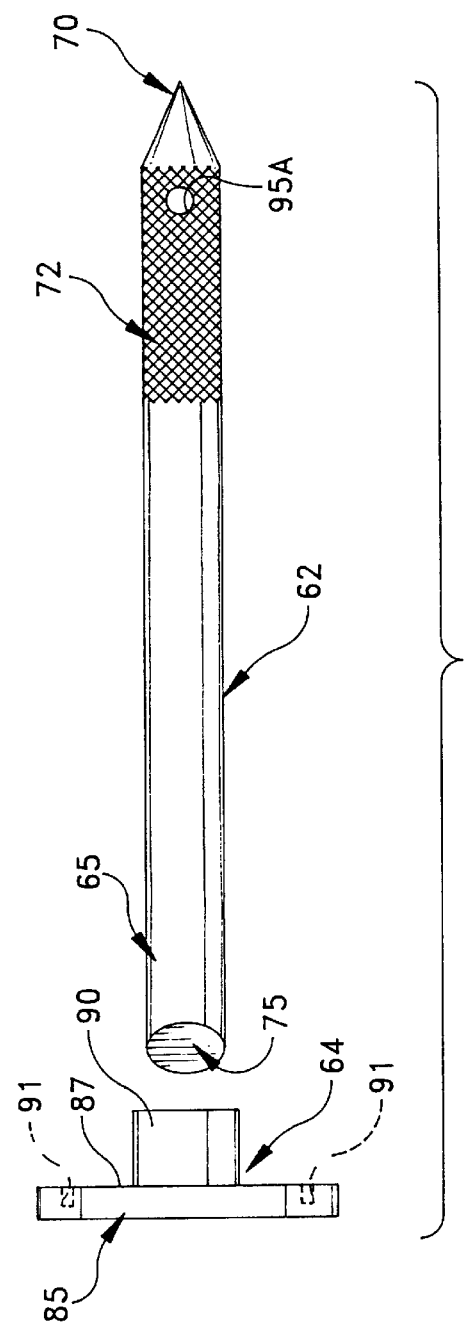
FIG. 5 is an exploded schematic view of the sheath assembly shown in FIG. 4.

In a further embodiment of the present invention, shown in FIGS. 4–8, a sheath assembly 60 is adapted to be inserted into a piece of meat so as to form a protective conduit for the insertion of flavoring stick 5 into the meat. More particularly, sheath assembly 60 includes a sheath 62 and a removable end cap 64. As seen in FIG. 5, sheath 62 comprises a tube having an open proximal end 65 and a closed distal end 70. A central passageway 75 extends distally from proximal end 65, and is long enough to accept a substantial portion of rod 10. The inner diameter of sheath 62 is sized so as to accept the portion of rod 10 that is coated with flavoring means 20. Typically, the inner diameter of sheath 62 is less than about 3/16 of an inch. The sheath's distal end 70 is preferably sharpened or pointed so as to facilitate entry of sheath 62 into food item 58, as will hereinafter be disclosed in further detail. Adjacent to distal end 70 is a graspable portion 72. Graspable portion 72 may be knurled so as to facilitate handling, or it may comprise other means (e.g., openings 95A and 95B and pull rod 100) for pulling sheath 62 through food item 58, as will hereinafter be disclosed in further detail, or it may be both. Preferably, sheath 62 is formed from an elongate piece of non-toxic material, such as one of the many well known metals or polymers that are suitable for food preparation.

Figure 7:
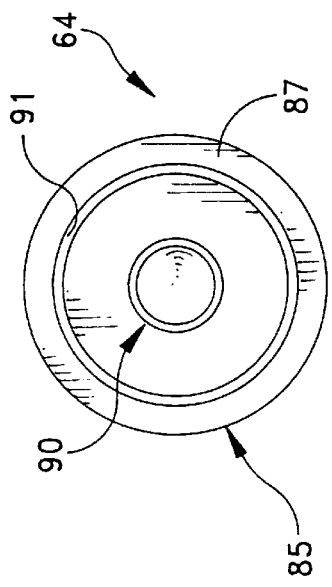
FIG. 7 is a distal end view of the same removable cap.
Figure 6:
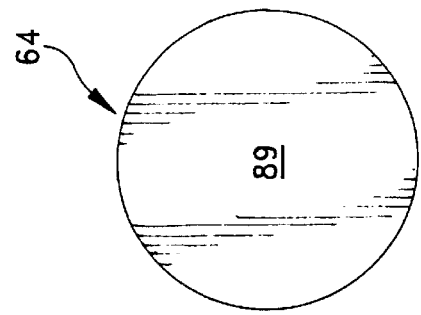
FIG. 6 is a proximal end view of the removable cap component of the sheath assembly shown in FIG. 4.

Referring next to FIGS. 5–7, sheath 62 may also include a removable end cap 64. End cap 64 comprises a support member 85 and a sheath-receiving portion 90. More particularly, sheath-receiving portion 90 preferably comprises a hollow cylindrical member that projects distally from distal surface 87 of support member 85. Sheath-receiving portion 90 is sized so as to accept a portion of proximal end 65 of sheath 62. Typically, sheath-receiving portion 90 is greater than about 3/16 of an inch in diameter, and it is about 1/2 of an inch to about 3/4 of an inch in length. Support member 85 preferably comprises a broad proximal surface 89 that is suitable for pressing with the palm of the hand. In one preferred embodiment, a groove 91 (FIG. 7) is disposed adjacent to the perimeter of bottom surface 87. Groove 91 is adapted to receive a portion of a shipping and storage container, as will hereinafter be disclosed in further detail. Support member 85 typically comprises a disk having a diameter of about 1.25 inches. Preferably, end cap 64 is formed from a non-toxic material, such as one of the many well known metals or polymers that are compatible with food preparation.

Figure 8:
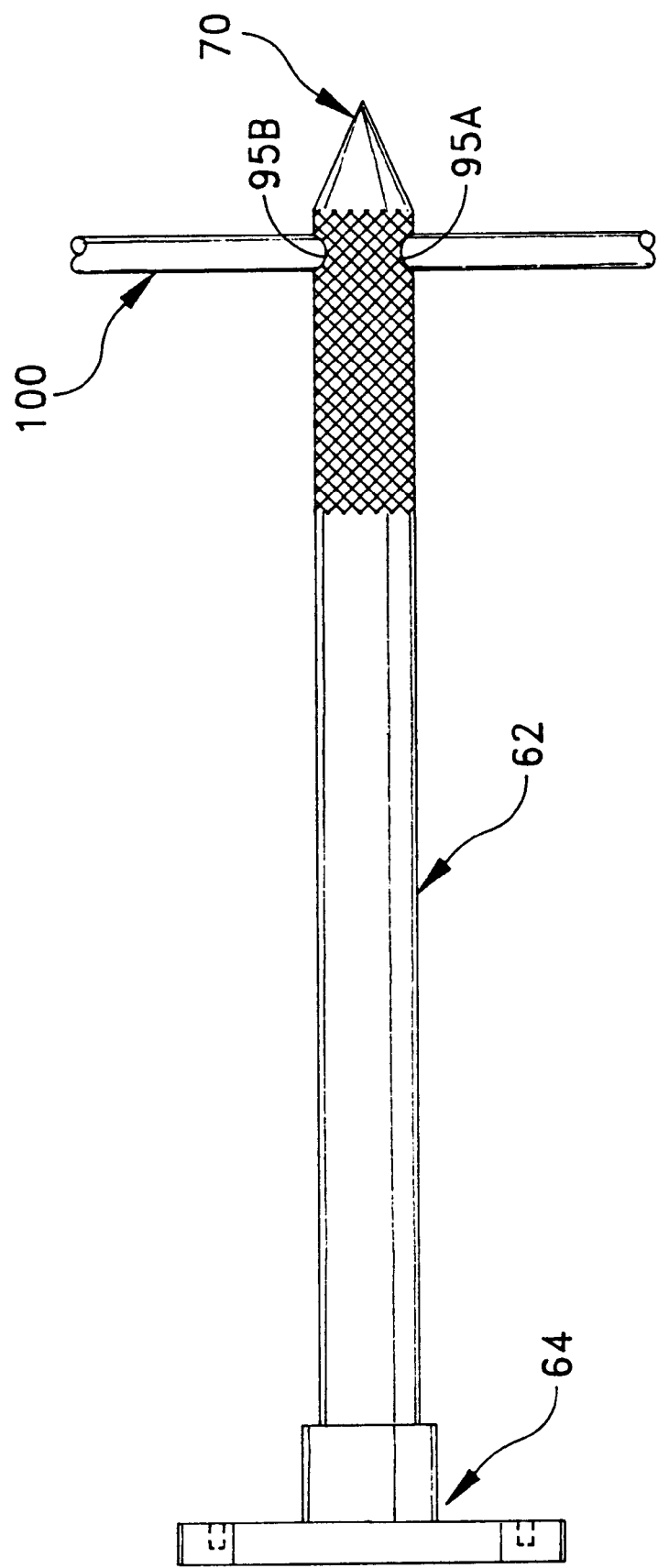
FIG. 8 is a side view of the sheath assembly shown in FIG. 4, with a pull rod positioned through the distal portion of the sheath.

Referring again to FIG. 4, sheath 62 may also define a pair of diametrically-opposed openings 95A and 95B that are positioned adjacent to, and proximate of, distal end 70. Openings 95A and 95B are sized so as to accept a pull rod 100 (FIG. 8). Typically, openings 95A and 95B have a diameter of approximately 1/16 of an inch, and they are positioned about 1 inch from the distal tip of sheath 62. Preferably, pull rod 100 is cylindrically shaped. Typically, pull rod 100 comprises a diameter of less than 1/16 of an inch and is long enough (approximately 2 inches or so) to be grasped by the fingers when the pull rod is disposed within openings 95A and 95B, as will hereinafter be disclosed in further detail.

Sheath assembly 60 can be used to deploy a flavoring stick 5 into a piece of meat. To this end, sheath 62 is first inserted into the piece of meat. More particularly, end cap 64 is first assembled to proximal end 65 by orienting end cap 64 so as to place its sheath-receiving portion 90 in opposing coaxial relation with the sheath's open proximal end 65. End cap 64 is then moved toward proximal end 65. As this occurs, open proximal end 65 slides into sheath-receiving portion 90 until the sheath engages bottom surface 87 of support member 85 (FIGS. 4 and 5). It will be appreciated that end cap 64 provides a relatively large surface area upon which to push with the base of the hand.

Figure 9:
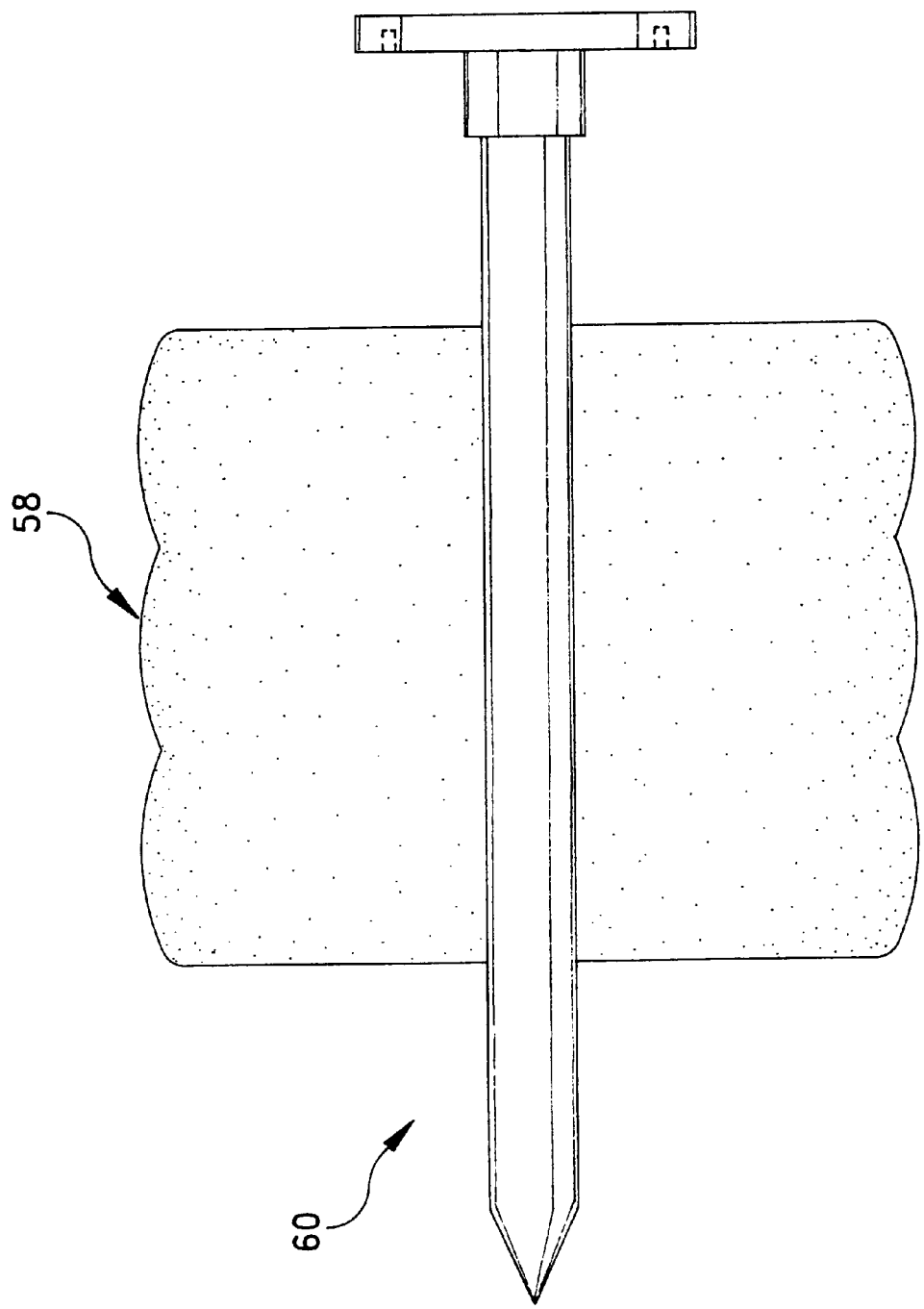
FIGS. 9–11 are side views, partially in section, showing a flavoring stick being deployed into a piece of meat using the sheath assembly.

Arranged in this way, sheath 62 may be inserted into the piece of meat. More particularly, sheath 62 is first oriented so that its sharp distal end 70 is disposed on the surface of the meat. The sheath is then inserted into and through the meat, distal end first. Sheath 62 is properly inserted into the piece of meat when the sheath's proximal end 65 is disposed adjacent to a first surface of the meat, and the sheath's graspable portion 72 projects outwardly from a second surface of the meat (see FIG. 9). Of course, if openings 95A and 95B are present in the sheath's graspable portion 72, the openings will be disposed free of the second surface of the meat in order to be able to accept pull rod 100.

Figure 10:
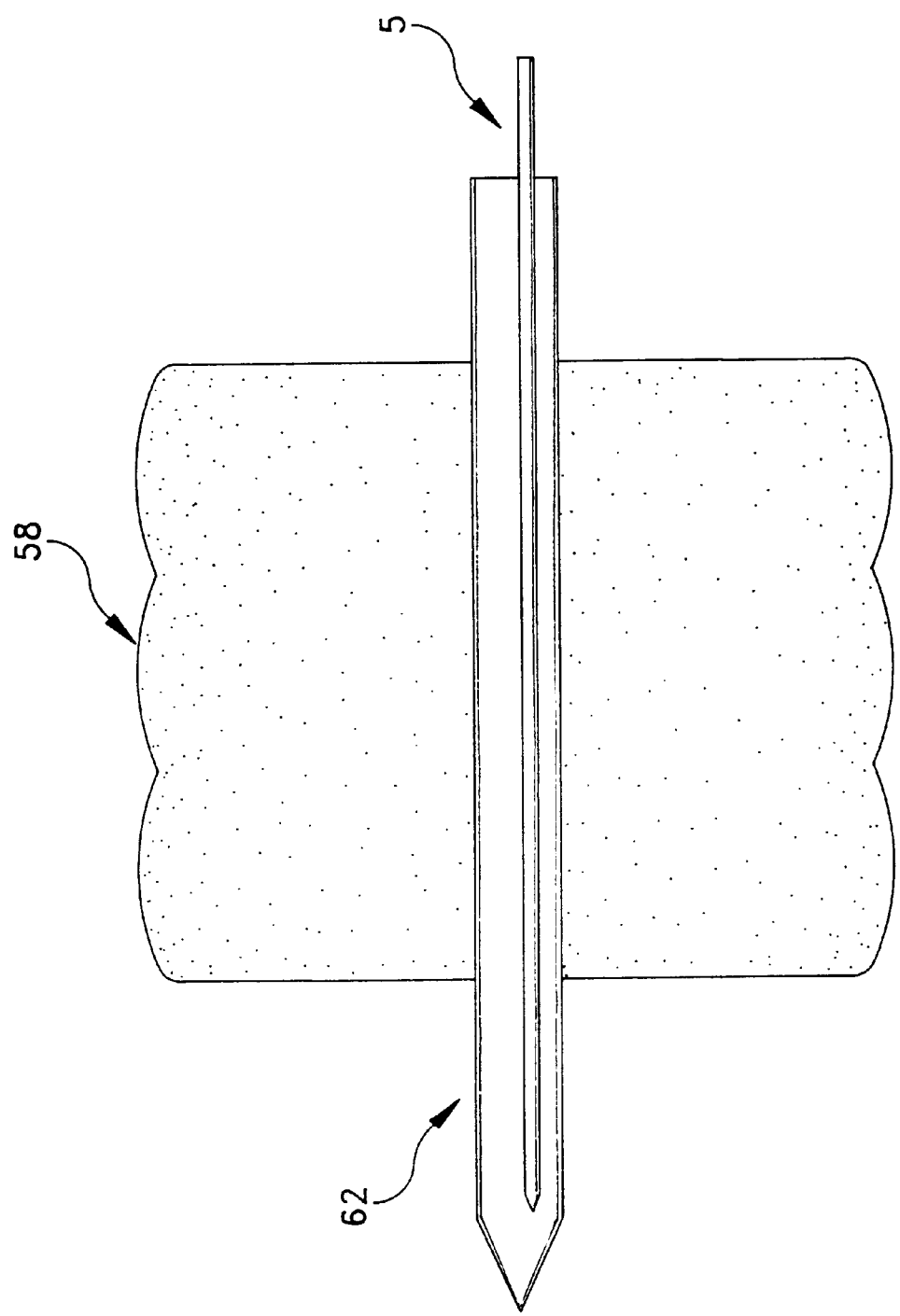

Once in this position, a flavoring stick 5 may be placed into central passageway 75 of sheath 62. More particularly, the sheath's end cap 64 is removed and a single flavoring stick 5 is inserted into sheath 62, distal end first, so that the stick's graspable portion 55 projects outwardly from the sheath's open proximal end 65 (see FIG. 10). Preferably, about a 1/2 to 1 inch length of the flavoring stick's graspable portion 55 projects outwardly from the proximal end of sheath 62.

Figure 11:
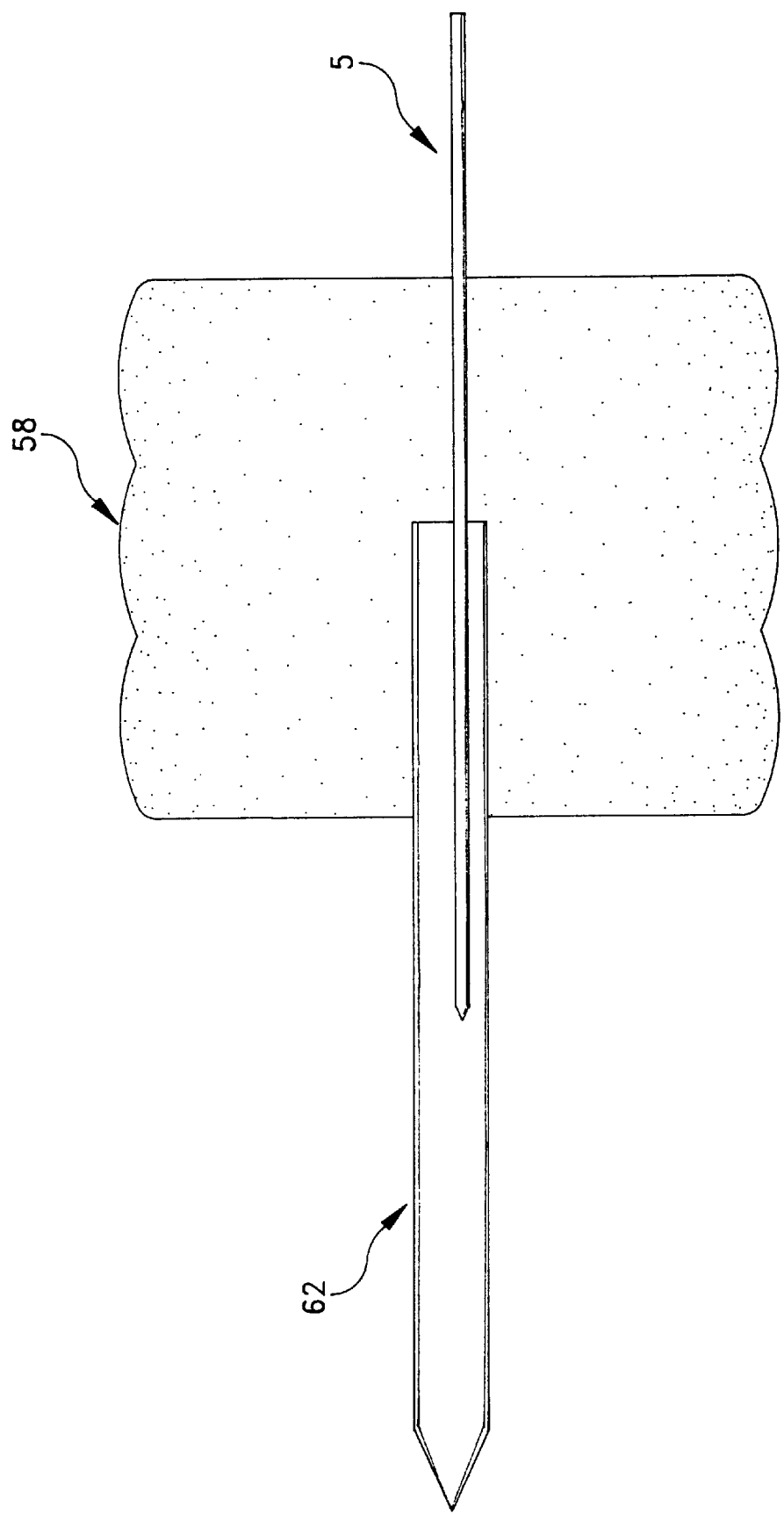

Once sheath 62 and flavoring stick 5 are disposed in the interior of the meat, graspable portion 55 of rod 10 is grasped in one hand, with thumb and forefinger, so as to hold the flavoring stick in place relative to the meat. At the same time, graspable portion 72 of sheath 62 is grasped with the thumb and forefinger of the other hand, and then the sheath is withdrawn axially and distally from the meat while the flavoring stick is held stationary (see FIG. 11). In this way, flavoring stick 5 is deployed within the meat without scrapping flavoring means 20 from it. This procedure may then be repeated until the meat contains the desired number of flavoring sticks, e.g., about eight flavoring sticks for a three pound roast beef.

It will also be understood that, once a sheath 62 and a flavoring stick 5 are disposed in the interior of the meat (FIG. 10), the withdrawal procedure may also be accomplished by using pull rod 100. More particularly, pull rod 100 is positioned in graspable portion 72 of sheath 62 by inserting the pull rod into openings 95A and 95B. In this way, pull rod 100 is disposed in substantially transverse relation to both sheath 62 and the second surface of the piece of meat. Preferably, substantially equal portions of pull rod 100 project outwardly from openings 95A and 95B. Once in this position, pull rod 100 may be grasped and pulled distally so as to draw sheath 62 out of the meat while flavoring stick 5 is held stationary relative to the meat.

It should be appreciated that, where sheath 62 is to be used to set the flavoring stick in the meat, the distal end of rod 10 need not necessarily be pointed, since the pointed distal end of the sheath will serve to open a passageway in the meat for the flavoring stick. In this case, the distal end of the rod can be blunt if so desired.

In another embodiment of the present invention, shown in FIGS. 12 and 13, a sheath 110 comprises an open proximal end 115, an open distal end 120, a central passageway 125 and a removable tip 130. More particularly, sheath 110 comprises a tube having both an open proximal end 115 and an open distal end 120. Central passageway 125 extends between proximal end 115 and distal end 120, and is long enough to accept a substantial portion of rod 10. The inner diameter of sheath 110 is sized so as to accept at least the portion of rod 10 that is coated with flavoring means 20. The sheath's distal end 120 is adapted to receive removable tip 130. Removable tip 130 preferably comprises a sharpened or pointed shape to facilitate entry into food item 58. The sheath's open distal end 120 and removable tip 130 both include cooperative fastening means 132 of the type (e.g., screw threads) that are well known in the art. It will be appreciated that end cap 64, openings 95A and 95B, and pull rod 100 may also be used in conjunction with sheath 110. This embodiment of the present invention is particularly well suited for cleaning central passageway 125 after use.

Figure 14:
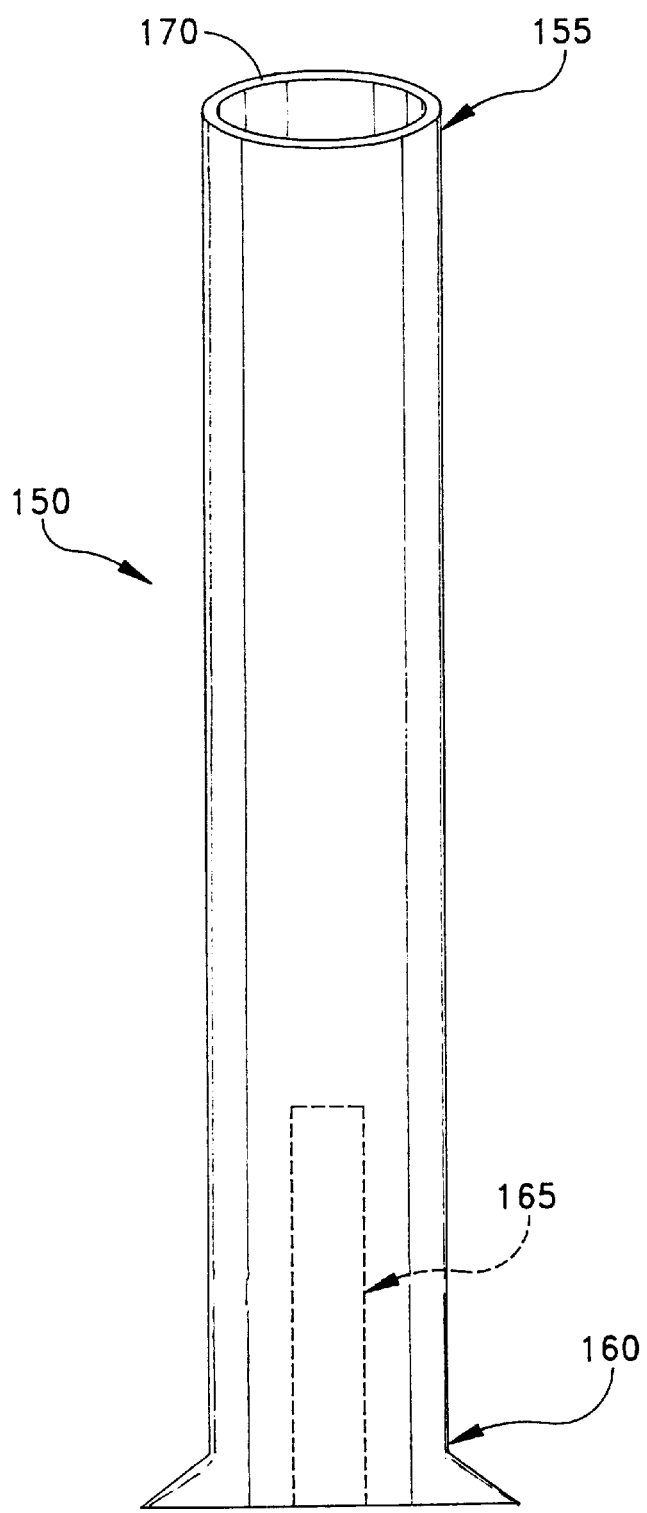
FIG. 14 is a schematic side view, partially in phantom, of a container adapted for storing and shipping a sheath and a plurality of flavoring sticks formed in accordance with the present invention.
Figure 15:
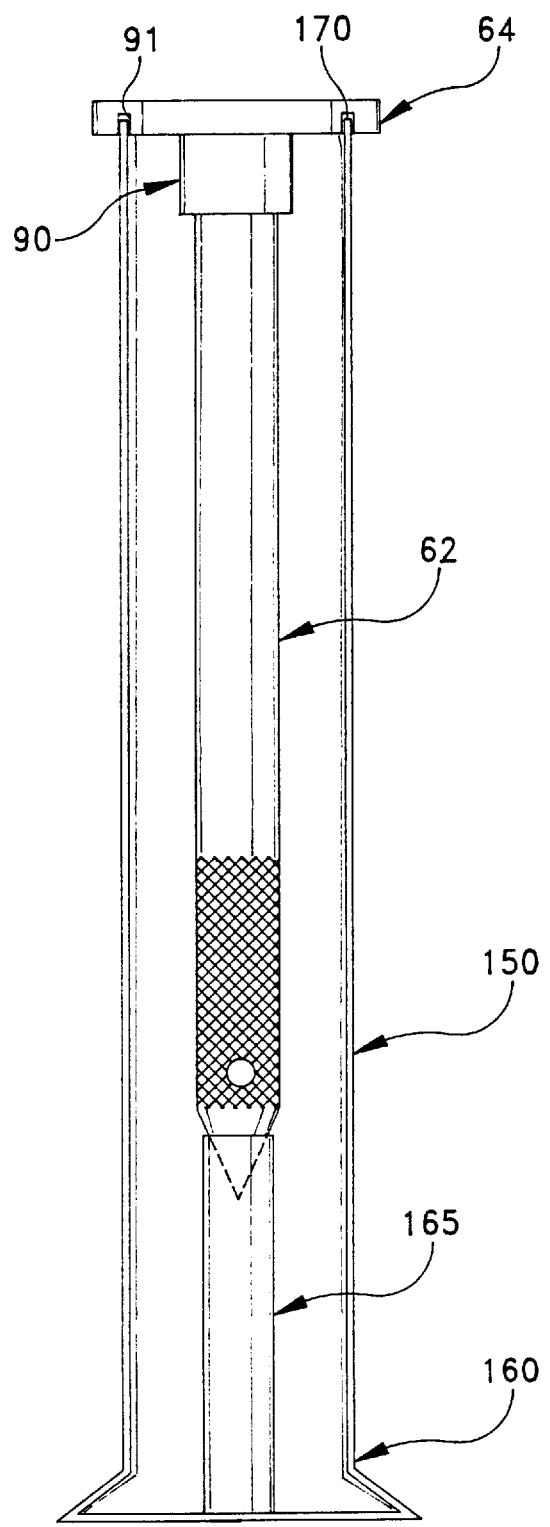
FIG. 15 is a side view, partially in section, of a fully assembled container, but with the flavoring sticks removed for clarity of illustration.
Figure 16:
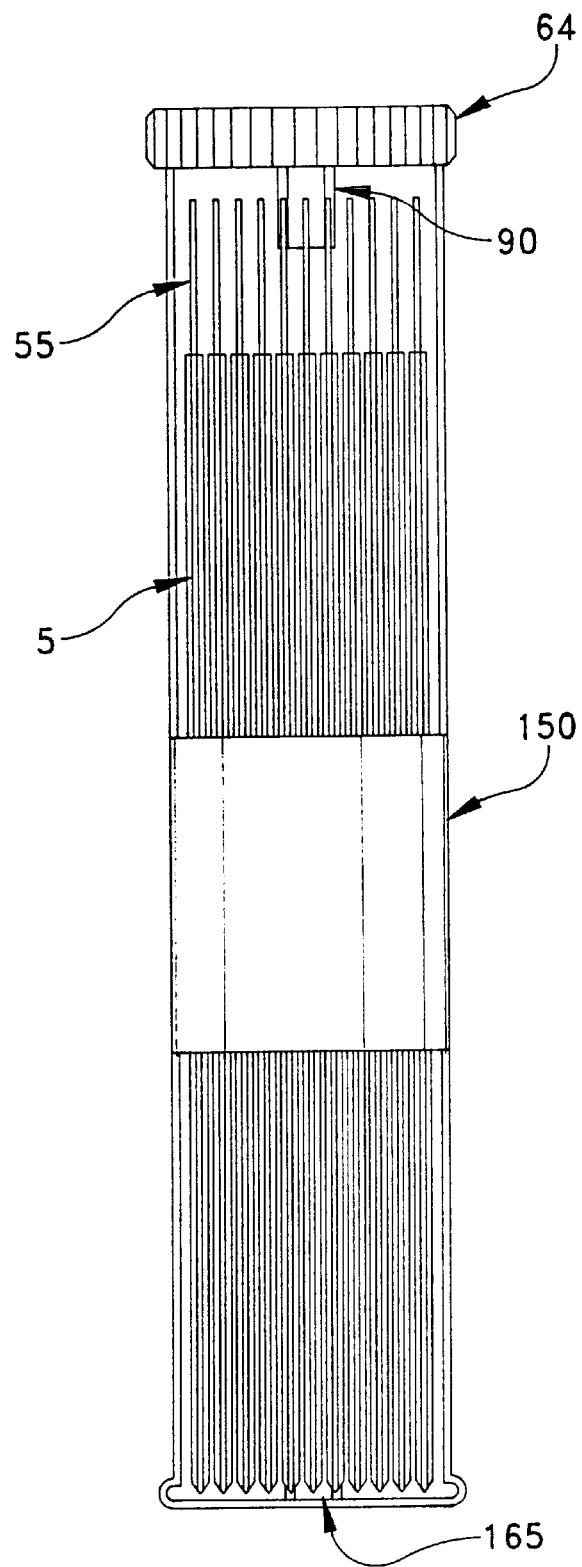
FIG. 16 is a side view, partially in section, of a container filled with flavoring sticks, with the sheath removed for clarity of illustration.

Referring now to FIGS. 14–16, a container 150 may be used to ship and store a plurality of flavoring sticks 5 and a sheath assembly 60. More particularly, container 150 comprises a hollow cylinder having an open proximal end 155 and a closed distal end 160 (FIG. 14). Proximal end 155 comprises an edge 170 that is sized so as to be snugly received within groove 91 of end cap 64. Alternatively, the container's proximal end 155 can releasably mate with end cap 64 in some other way, e.g., via a screw engagement or a pressure fit. A support post 165 is centrally disposed on the inner surface of closed end 160, and projects upwardly therefrom. At least the proximal end of support post 165 is hollow.

Referring to FIGS. 15 and 16, container 150 may be used to store and/or ship a plurality of flavoring sticks 5 and a sheath assembly 60 in the following manner. A plurality of flavoring sticks are first placed into container 150. Then, receiving portion 90 of end cap 64 is fitted onto open proximal end 65 of sheath 62 (or 110) so as to form a sheath assembly. This assembly is then inserted into container 150, distal end first. The sheath assembly continues into container 150 until its distal end 70 enters the top end of support post 165. As this occurs, edge 170 of container 150 slips into groove 91 of cap 64, thereby sealing flavoring sticks 5 and the sheath assembly 60 in container 170.

MODIFICATIONS

It will be appreciated that various changes, modifications and alterations may be made to the preferred embodiments disclosed above without departing from the spirit or scope of the present invention.

Figure 17:
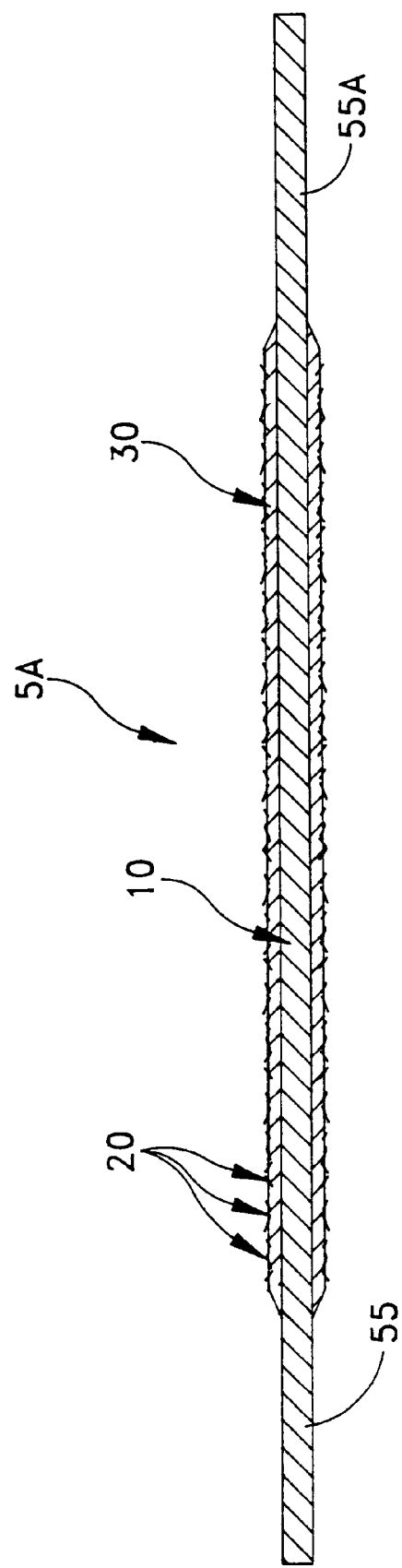
FIG. 17 is a side view, partially in cross-section, of a flavoring stick similar to that shown in FIG. 1, but having two graspable end portions.

For example, in one such alternative embodiment of the invention, shown in FIG. 17, flavoring stick 5A comprises two graspable portions 55 and 55A. This embodiment has been found to be particularly advantageous when used to flavor hot dogs and other sausage and sausage-type prepared meats.

Additionally, rod 10 may be wholly formed from a lipid material, or some other degradable material, so that it completely dissolves during cooking.

Also, binder 30 may be formed from any water soluble material so that a coated rod could be used to flavor a drink.

Furthermore, the sheath-receiving portion 90 of end cap 64 may be sized so as to accept a part of the rod's graspable portion 55. In this way, the flavoring stick may be more easily inserted into food item 58 when sheath 62 (or sheath 110) is not in use.

Also, the present invention may be used for flavoring a variety foods, including prepared meats, vegetables, fruits, and grains. For example, flavoring means 20 may comprise nutmeg and cinnamon for use in flavoring apples or squash.

ADVANTAGES OF THE INVENTION

Numerous advantages are obtained by employing the present invention.

More specifically, an improved apparatus and method for flavoring foods are provided.

In addition, an improved apparatus and method for flavoring a food item are provided that allows the flavoring means to be inserted within the food item without the flavoring means being scraped off the apparatus during insertion.

Also, an improved apparatus and method for flavoring a food item are provided that use a lipid material or carbohydrates or hydrocolloids to releasably retain flavoring means on a delivery device.

Also, an improved apparatus and method for flavoring a food item are provided that is easily used by both professional and amateur chefs.

Furthermore, an improved apparatus and method for flavoring a food item are provided that are simple to use and economical to produce.

And an improved apparatus and method for flavoring a food item are provided which ensure proper dispersal of the flavoring substances within the food item.

It is to be understood that the present invention is by no means limited to the particular constructions herein disclosed and shown in the drawings, but also comprises any modifications or equivalents within the scope of the claims.

What is claimed is:

1. Apparatus for flavoring a solid food to be cooked and which ensures the proper placement of flavoring material substantially within the interior of the solid food prior to or during cooking of the said food comprising:

a rod capable of piercing said solid food, said rod having one pointed end to facilitate insertion of said rod into said solid food, and defining an outer surface;

flavoring material disposed on at least a portion of said outer surface of said rod for flavoring said solid food; and retaining means for releasably retaining said flavoring material in position on said at least a portion of said outer surface of said rod, said retaining means comprising an edible binder which (i) adhesively attaches said flavoring material to at least a portion of said outer surface of said rod, (ii) is viscous at elevated temperatures, and (iii) is substantially rigid at ambient temperatures, such that neither said edible binder nor said flavoring material will be dislodged from said at least a portion of said outer surface of said rod during normal handling or during insertion of said rod into said food, but during cooking of said solid food, when said rod is inserted therein, said edible binder will become viscous and then substantially liquid so that the flavoring material is first slowly released into the interior of the solid food and then the remainder of the flavoring material is fully released into the interior of the solid food.

2. Apparatus according to claim 1 wherein said rod comprises wood.

3. Apparatus according to claim 2 wherein said rod comprises bamboo.

4. Apparatus according to claim 1 wherein said flavoring material comprises at least one spice.

5. Apparatus according to claim 1 wherein said flavoring material comprises at least one herb.

6. Apparatus according to claim 1 wherein said flavoring material comprises at least one aromatic vegetable.

7. Apparatus according to claim 1 wherein said flavoring material comprises at least one flavor enhancer.

8. Apparatus according to claim 1 wherein said flavoring material further includes a meat tenderizer.

9. Apparatus according to claim 1 wherein said edible binder comprises a lipid material.

10. Apparatus according to claim 1 wherein said edible binder comprises a carbohydrate.

11. Apparatus according to claim 1 wherein said edible binder comprises a hydrocolloid.

12. Apparatus according to claim 1 wherein said edible binder consists essentially of partially hydrogenated cotton seed oil, partially hydrogenated soybean oil and soybean lecithin.

13. Apparatus according to claim 1 wherein at least one portion of said outer surface of said rod is devoid of said flavoring means.

* * * * *